United States Patent [19]
Gabin et al.

[11] Patent Number: 5,943,397
[45] Date of Patent: Aug. 24, 1999

[54] NETWORK ASSISTED CALLBACK SYSTEM

[75] Inventors: Jay Gabin, Eatontown; Marc P. Kaplan, Aberdeen, both of N.J.

[73] Assignee: AT&T, Middletown, N.J.

[21] Appl. No.: 08/798,578

[22] Filed: Feb. 10, 1997

Related U.S. Application Data

[63] Continuation of application No. 08/175,021, Dec. 29, 1993, abandoned.

[51] Int. Cl.$^6$ .............................. H04M 3/42; H04M 3/50
[52] U.S. Cl. ...................... 379/67.1; 379/213; 379/201; 379/216
[58] Field of Search .................... 379/67, 88, 89, 379/127, 142, 197, 245, 246, 247, 209, 216, 213, 214, 355

[56] References Cited

U.S. PATENT DOCUMENTS

| | | | |
|---|---|---|---|
| 4,672,660 | 6/1987 | Curtin | 379/142 |
| 4,720,848 | 1/1988 | Akiyama | 379/88 |
| 4,766,604 | 8/1988 | Axberg | 379/197 |
| 4,776,005 | 10/1988 | Petriccione | 379/142 |
| 4,800,583 | 1/1989 | Theis | 379/142 |
| 4,873,713 | 10/1989 | Yamanouchi | 379/88 |
| 4,873,719 | 10/1989 | Reese | 379/142 |
| 4,878,239 | 10/1989 | Solomon | 379/67 |
| 4,942,598 | 7/1990 | Davis | 379/142 |
| 4,985,916 | 1/1991 | Tachuk | 379/178 |
| 5,054,052 | 10/1991 | Nonami | 379/142 |
| 5,058,152 | 10/1991 | Solomon | 379/67 |
| 5,155,761 | 10/1992 | Hammond | 379/142 |
| 5,249,221 | 9/1993 | Ketring | 379/127 |
| 5,265,145 | 11/1993 | Lim | 379/142 |
| 5,282,243 | 1/1994 | Dabbaghi | 379/211 |
| 5,283,818 | 2/1994 | Klausner | 379/89 |
| 5,361,265 | 11/1994 | Solomon | 379/142 |

FOREIGN PATENT DOCUMENTS 0089846  4/1989  Japan ...................... 379/142

Primary Examiner—Krista M. Zele
Assistant Examiner—Daniel S. Hunter
Attorney, Agent, or Firm—Henry T. Brendzel

[57] ABSTRACT

A network assisted callback method and system for managing calls that fail to reach to a subscriber, and facilitating callback by the subscriber to one or more calling parties. In an embodiment of the invention, a call to a subscriber is routed to an interexchange network which attempts to complete the connection. If the caller fails to reach the subscriber, the network prompts the caller to determine whether a callback is desired, and to verify and obtain additional information. The network stores the information in a subscriber database file-folder. When the subscriber later decides to return phone calls, the subscriber dials an 800 number from any telephone station in order to access the network callback features. The network callback service may include automatic connection to the most recent calling party, or selective connection to any calling party. The network may effectuate this connection either by temporarily provisioning the 800 number with the number of the most recent calling party, or by making an outbound call to the calling party, and then merging the user's incoming call with the outbound call. The network assisted callback service provided by the present invention is also applicable as an enhancement to a "locator phone" service or a normal pager service.

17 Claims, 4 Drawing Sheets

NETWORK ASSISTED CALLBACK SYSTEM

This application is a continuation of application Ser No. 08/175,021, filed on Dec. 29, 1993 now abandoned.

TECHNICAL FIELD

The present invention relates generally to a method and system for personal communications, and more particularly, to a network assisted method for a user to return calls to any caller who has attempted to reach the user.

BACKGROUND OF THE INVENTION

The advancements in hardware and software development, and concomitantly the rapid decrease in their cost, has resulted in many premises based features, such as answering machines, caller-ID boxes with memory, and voice-mail. The lack of centralization of such premises based features, however, results in physical and/or economic limits on the related services that may be provided. With answering machines and voice-mail, in order to return a call, typically a user must access the answering machine or voice-mail system, listen to a message to identify each caller, then retrieve the phone number of the caller (or have the number memorized), followed by placing the call. Although caller-ID boxes store the caller's number, regardless of whether the caller intended to leave a message, the stored number may not necessarily be the number of the caller's telephone station, because the number may be associated with a private branch exchange (PBX). Also, the user must still manually dial the calling number, and the caller-ID service is not generally adapted for remote use. When these premises based features and devices are accessed from a remote location, not only must the user know or make note of the caller's number, but also, if the user uses a calling card number to place the call, there is an increased security risk when entering the calling card number at a public phone.

The development of the Intelligent Network, which links computer based elements of the nationwide telecommunication system, has resulted in a proliferation of services to users. Some of these services include toll-free 800 calls, automated call charging to credit cards, and virtual private networks. Network services, however, have historically been based on routing an incoming call to a final destination: voice mail, a paging system, an answering machine, a secretary, etc. There have been no provisions for assisting callback via a network.

Indeed, there has been a recent implementation of a callback feature, wherein a user who fails to respond to an incoming call at a telephone station may dial a code (e.g., "*69"), thereby initiating a callback to the most recent caller. This callback service, however, is typically limited to an intraLATA (Local Access Transfer Area) calling station, and is further limited to calling back the line associated with an ANI (Automatic Number Identification), which is not necessarily associated with the particular telephone station of the calling party. Also, the callback service limits the user to responding to failed calls from the telephone station to which the failed call was placed. Also, the user does not have any features available beyond those for calling back the most recent failed caller.

There remains, therefore, a void in network provided services which facilitate callback. Moreover, there is an increasing importance of communicating with mobile customers, and therefore, providing mobile customers with services not only comparable to services found at a home or office, but also particularly adapted to the needs of a mobile user.

SUMMARY OF THE INVENTION

The present invention overcomes the above, and other, limitations while further providing an additional home or office telephone service, not provided by prior art network-based or premises-based services or systems, which may also be adapted for the needs of a mobile user. In accordance with the present invention, any caller who fails to reach a user is identified by the network which stores this identifying information in a database. The identifying information may include the caller's automatic number identification (ANI), which may be verified by the calling party via a query by the network to the calling party, who may confirm the ANI or enter an alternative number and/or leave a voice message. Prior to acquiring this information, the calling party may first be asked whether it desires to be called back. When the user later decides to return phone calls, the user dials an 800 number from any telephone station, and the 800 number provides access to the network callback features. For users having a personal calling number, and employing a beeper or a locator phone device, after a calling party has been identified and stored in the network, the network may invoke a transmission signal to the beeper or device which will notify the user that a calling party desires a return call.

In accordance with the present invention, the network callback service may include a range of features, and one or more of these features may be available to the user depending on the user's needs or desires, which may also be stored by the network. As a basic service, when the network assisted callback service is accessed by the user via the 800 number from any telephone, the network automatically connects the user to the most recent calling party. The network may effectuate this connection either by temporarily provisioning the 800 number with the number of the calling party, or by making an outbound call to the calling party, and then merging the user's incoming call with the outbound call. The network may store a full list of all such calling parties, and the user may select which callers to automatically callback, save, or erase from the list.

In accordance with different embodiments of the present invention, there are different ways to manage the 800 numbers. In one embodiment, each user is assigned a separate 800 number. Alternatively, one 800 number may be used for all users who each have a personal identification number (PIN) that is entered upon request from the network after dialing the 800 number. The network assisted callback service provided by the present invention is also applicable as an enhancement to a "locator phone" service or a normal pager service. When the present invention is used in conjunction with these services, the 800 number may be transmitted to the locator phone device or normal pager, and the network may manage and dynamically allocate a set of 800 numbers such that a given user may receive a different 800 number for each access to the network assisted callback service.

BRIEF DESCRIPTION OF THE DRAWINGS

The invention will be described in greater detail below by way of reference to the accompanying drawings, wherein.

DETAILED DESCRIPTION OF THE PREFERRED EMBODIMENT

The present invention bridges the gap between an initial call and the returned call, by using network capabilities to capture the caller's information and provide an efficacious means for reaching the caller at a later time. This service, herein referred to as network assisted callback, could be used as a terminating treatment for a variety of call types. Preferably, this service is implemented on a subscriber basis, such that the subscriber specifies a particular account number, telephone number, or other personal identification number (e.g., normal beeper number or 800 number), which is used by callers to contact the subscriber, to which the network assisted callback service should apply. The present invention may be practiced in connection with the personal mobile communication system disclosed in commonly assigned U.S. patent application Ser. No. 07/843,685 to Carlsen et al., filed on Feb. 28, 1992, which is hereby incorporated by reference.

Figure 1:
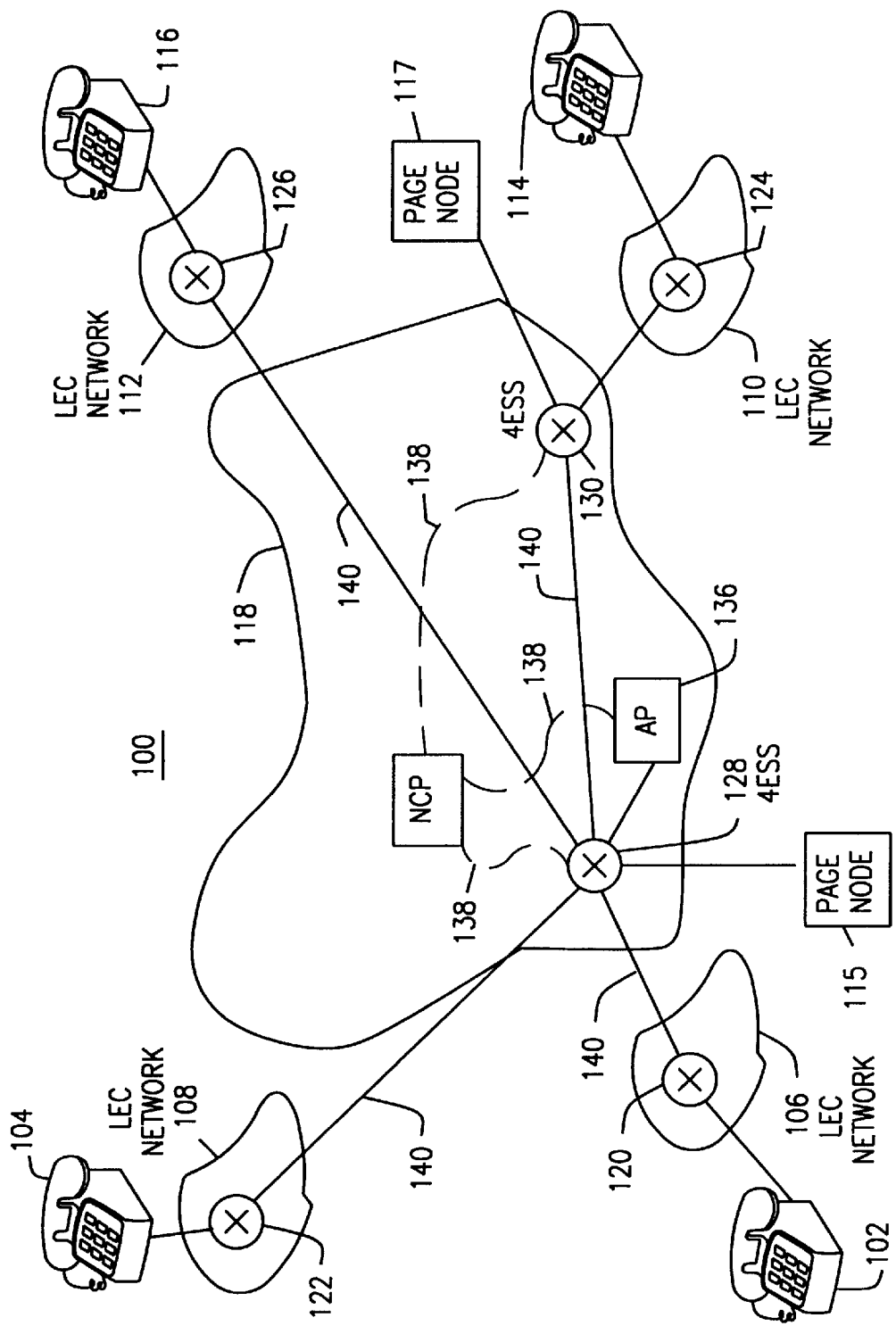
FIG. 1 shows, in simplified form, an exemplary telephone network embodying the principles of the invention.
Figure 2A:
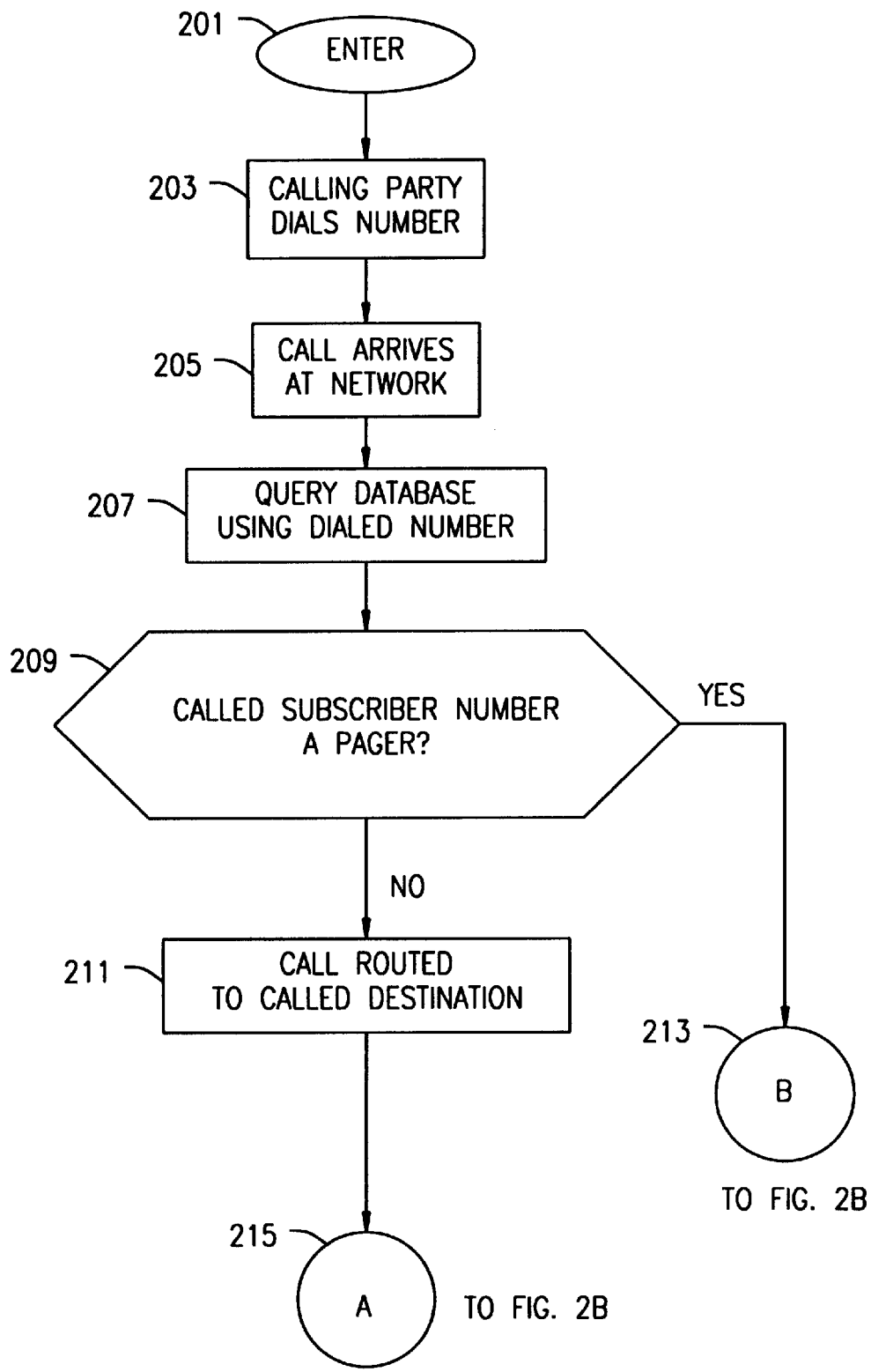
FIG. 2A and FIG. 2B, in combination, is an operational flow chart of an exemplary process for managing a telephone call by a calling party, in accordance with the present invention.
Figure 2B:
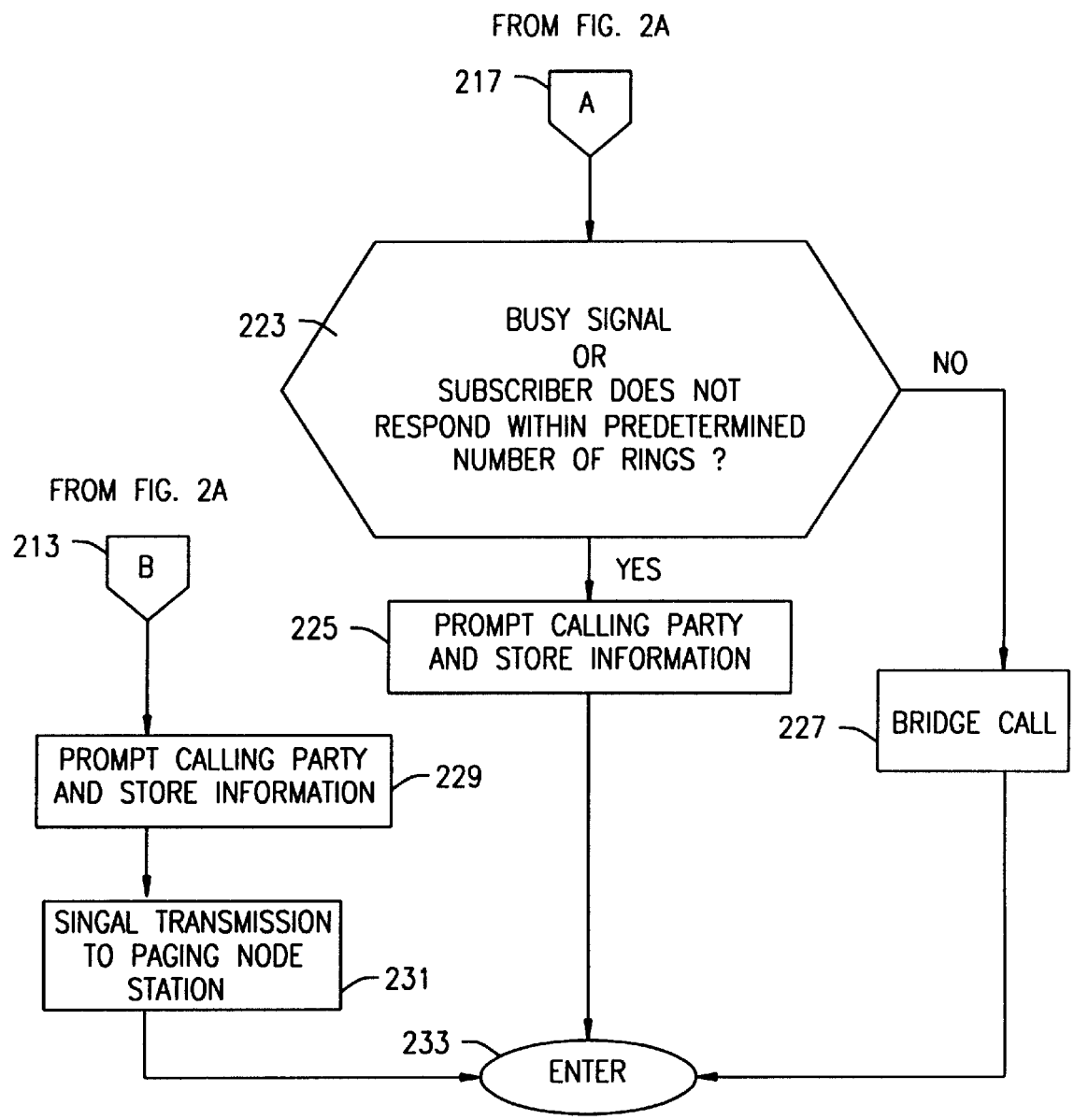
Figure 3:
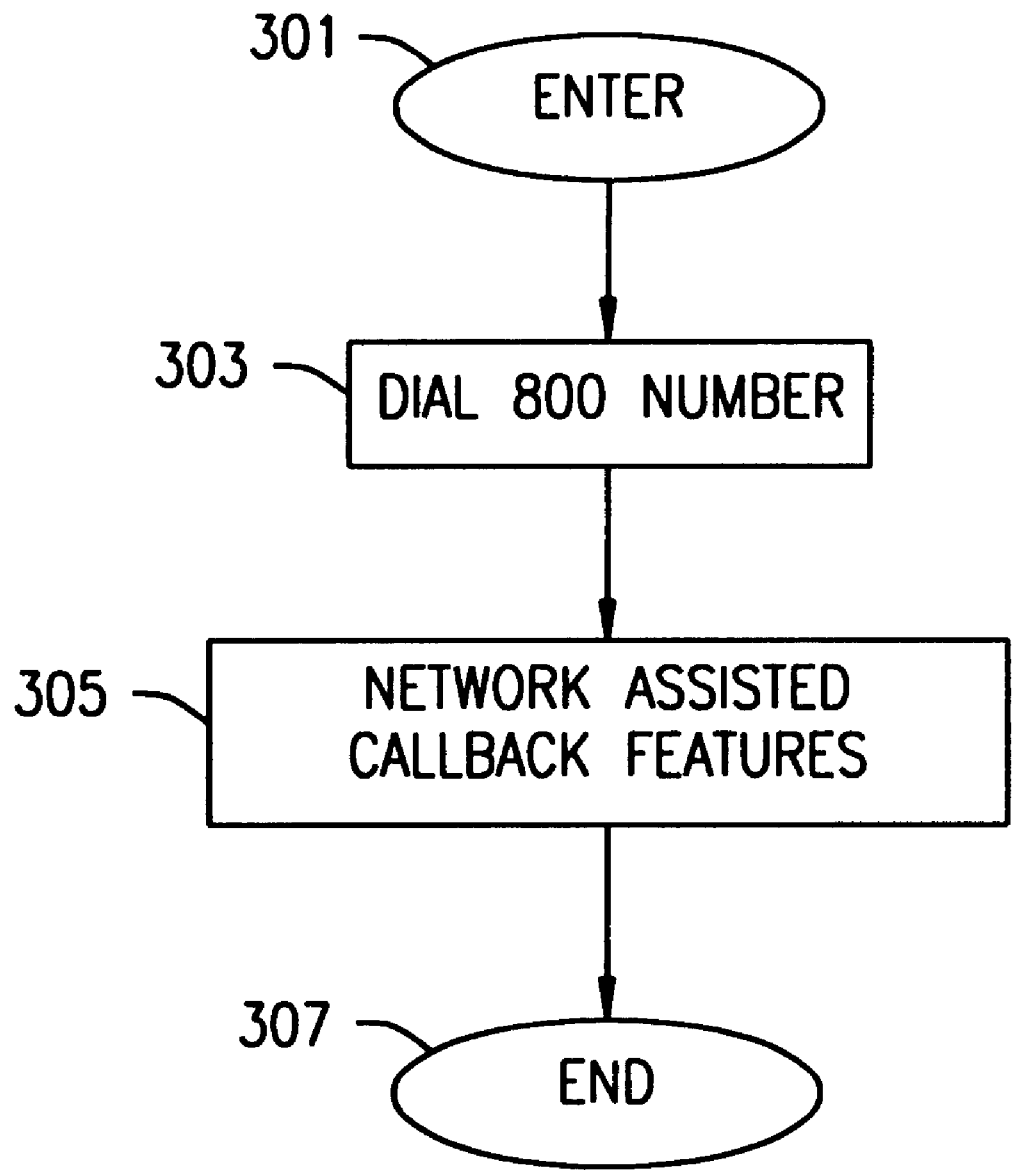
FIG. 3 is an operational flow chart of an exemplary process for implementing network assisted callback, in accordance with the present invention.

Referring now to the accompanying drawings there are shown in FIGS. 1–3 the preferred embodiments of the system and method for network assisted callback according to the present invention.

Shown in FIG. 1, in simplified form, is exemplary telephone network 100 which may be adapted to implement the principles of the present invention. Telephone network 100 comprises originating stations 102 and 104, local exchange carrier (LEC) networks 106, 108, 110 and 112, destination stations 114 and 116, paging nodes 115 and 117, and long distance network 118, illustratively the AT&T network. Originating stations 102 and 104, and destination stations 114 and 116, are representative of a plurality of network endpoints, the remainder of which are not shown for clarity of exposition. Only those portions of telephone network 100 necessary for calls to be made from an origin to a destination are shown.

LEC networks 106, 108, 110 and 112 contain switching machines 120, 122, 124, 126, respectively, each switching machine capable of connecting a plurality of network endpoints to long distance network 118. Such switching machines are well known and may be, for example, an AT&T 5ESS® switch. These switches are stored-program control switches which contain the service logic required to intercept calls which require special handling by the network, and to send queries to the network. Long distance network 118 comprises switching machines 128 and 130, network control point (NCP) 132, and adjunct processor (AP) 136. NCP 132 is of a type well known in the art. Switching machines employed in communications networks are well known. Switching machines 128 and 130 are illustratively AT&T's No. 4 ESS™ switch. In addition, it is understood by one skilled in the art that the long distance network 118 includes a network of such switches, network control points, and adjunct processors, in addition to other elements which are not depicted in FIG. 1.

Switching machines 128 and 130, NCP 132, and AP 136 are interconnected in the manner shown by signaling network 138, represented by dashed lines. Originating stations 102 and 104, destination stations 114 and 116, paging node stations 115 and 117, switching machines 120, 122, 124, 126, and switching machines 128 and 130, and AP 136 are interconnected by information links 140, in the manner shown. Information links 140 are of the well known types in the art for interconnecting communicating apparatus and can carry at least voice, data, and video. Each of information links 140 need not have the same capacity. A typical implementation would comprise a mix of conventionally known digital transmission links, e.g., DS0, DS1 and DS3, provisioned in accordance with the needs of the network providers. Operation and programming of the network elements shown in FIG. 1 in order to implement network services are well known to one skilled in the art.

FIG. 2A and FIG. 2B together represent an operational flowchart for handling a call to a party subscribed to the network assisted callback service in accordance with an embodiment of the present invention. Preferably, the network assisted callback service is offered as a subscription feature. A user who subscribes to the service associates a particular number with the callback feature. This number could be a plain old telephone service (POTS) number, a normal pager number, an 800 number, a mobile phone number, or a personal calling number which may be used in connection with a pager or locator phone device. The network 118 stores this subscriber information in a database.

The process begins in step 201 when a caller decides to make a call to the number of an individual who is subscribed to the network assisted callback service. The calling party at originating station 102, for example, is detected to go off hook by switching machine 120. Thereafter, in step 203, the caller dials the number of the desired destination, which may include one of the following numbers referred to hereinabove: a pager number, an 800 number, a POTS number, a cellular telephone number, or a personal calling number, hereinafter referred to generically as the destination number. In accordance with the present embodiment, the LEC network 106 recognizes the number as one requiring special handling, and therefore, routes the call to switching machine (e.g. toll switch) 128 of the network 118. The special handling function by the LEC network 108, which is a conventional function (e.g., 800 numbers, and long distance numbers), may be implemented directly in response to receiving any of the aforementioned number types which the LEC network recognizes as requiring routing to network 118, or may be implemented in accordance with a conventional call-forwarding service typically offered by LECs, wherein an LEC customer specifies a number to which calls may be forwarded. For example, an LEC customer may call-forward phone calls normally directed to his POTS number to a "network call-back" number type, which may be any number that the LEC network recognizes as requiring routing of the call to network 118. In any event, in step 205, as a result of the special handling routine, the call arrives at network 118.

In step 207, in response to the arrival of the call at switch 128, the database holding the subscriber information is queried via NCP 132. In the embodiment shown in FIG. 2A and FIG. 2B, (step 209) generally the query may indicate that the subscriber number requires call routing directly to the subscriber (step 211), or that other call handling is required that may not involve attempting to connect the call (e.g., a pager number, step 213). If the former situation is indicated by the query, the network provides signaling information for routing the call. For example, if the dialed number were an 800 number, the NCP 132 would typically perform a number translation, providing the switching machine 128 with, for example, the POTS number required to route the call to the subscribing party. As understood by one skilled in the art, the call is appropriately routed to other nodes in the network, using in-band or out-of-band signaling. For example, if destination station 114 represents the called subscribing party, the call is routed from network switching machine 128 to network switching machine 130, and then to LEC network 110.

In step 223, if the line is not busy, and the called party answers within a predetermined number of rings, then the normal call connection process occurs (step 227) until a party terminates the call by hanging up. Alternatively, in step 223, after a predetermined number of rings, or if switching machine determines that the called number is busy (step 223), in step 225 the appropriate AP (e.g., AP 136) launches an in-band prompt or information request to the calling party. Responses to the prompts may include both conventional dual tone multiple frequency (DTMF) signals and voice signals. Such prompts may include whether the calling party wishes to be called back, and if so, the AP may further request the calling party to enter their phone number. If the signaling to the long distance network 118 previously included the calling party ANI, then this query may be to confirm the ANI number as the callback number, or to enter a callback phone number. The query may also include the possibility of leaving a voice message, such as the caller's name. This information is stored in the long distance network database, and the handling of the call to the subscribing party is concluded (step 233).

In the present embodiment, if the network database query (step 207) indicates that the dialed number is a pager number (step 209) then as with conventional pager protocol the calling party is prompted in step 229, in accordance with the hereinabove described step 225. After storing this information, in step 231 the network invokes a signaling routine to complete a transmission to the paging device via an appropriate paging node station (e.g., paging node station 115). It is understood that paging node stations may be accessed via a direct network connection, or via an LEC using switched access, or by other data links and accessing arrangements. In accordance with the present invention, the transmission to the paging device preferably includes an 800 number which is received and stored by the pager and later used to access the network assisted callback service. In addition, this transmission may include the phone number that was entered by the calling party.

Accordingly, the present invention may be adapted as an enhancement of ordinary pager service. As discussed hereinabove, when a calling party dials a pager number, the LEC switch routes the call to the long distance network which prompts the calling party (e.g., verifying ANI, entering a phone number, requesting voice message, etc.) and stores the responsive information. The network then transmits an 800 number to the paging device according to a selected 800 number management method. Until the user accesses the network using the 800 number, subsequent page requests need not result in further transmissions to the paging device, since the user is already aware of the outstanding page. It is only important that the network stores information (e.g., phone numbers) for subsequent calling parties. It is preferable, however, to send a transmission containing the identification of each identified calling party to the paging device. It is clear that from the perspective of a calling party, such an enhanced paging system appears virtually identical to an ordinary paging system. The subscriber, however, is provided with enhanced service since, as will become further evident hereinbelow, the subscriber only must dial the 800 number in order to access and establish call connection with any of the calling parties.

In a further embodiment, not shown in FIG. 2A and FIG. 2B, a subscriber may selectively use the callback service only as a message retrieval and automatic callback service. That is, when such a subscriber is identified in step 207, a call is not routed to the subscriber destination (i.e., step 211 is not performed); instead, the operational flow would directly jump to step 225, wherein, for example, the calling party would be prompted to indicate whether a callback is desired etc., and the information would be stored in the network (e.g., the subscriber's file-folder) for future retrieval by the subscriber.

FIG. 3 is an operational flowchart illustrating a method for responding to a subscriber access to the network assisted callback service in accordance with an embodiment of the present invention. The process begins in step 301 when a user decides to access the network assisted callback service. In step 303, the subscriber dials a number from any telephone station which accesses the long distance network 118 (FIG. 1) via a LEC switch which recognizes the dialed number as requiring special handling. The beeper or other device may be adapted to automatically dial the 800 number upon the users request.

In accordance with an aspect of the invention, the telephone number for accessing the callback feature is typically a toll-free, e.g., 800-type, of telephone number. Toll-free access to the callback feature simplifies return calls from pay phones or any phone where charges are not automatically billed to the user. Other types of numbers, e.g., 900 or 500 numbers, could also be used. The owner of the "toll-free" telephone number, rather than the subscriber of the telephone line over which the call is made, incurs the charge for calls to such a number. Handling of 800 numbers by LEC networks and long distance networks is well known in the art.

In one embodiment of the present invention, a distinguishable 800 number is assigned to each subscriber. Alternatively, an 800 number may be assigned to a group of users, and each user is further assigned a personal identification number (PIN). For personal calling number users, i.e., users who possess a normal paging receiver or similar device (e.g., locator phone device) for receiving a signal transmitted to the personal calling number regardless of location, the network may manage a set of 800 numbers which are dynamically allocated and transmitted to the paging receiver or similar device, which stores the 800 number. Such allocation requires that the network maintains a form of a dynamic allocation table which ensures that at any given time all allocated (i.e., transmitted) 800 numbers are uniquely associated with a particular subscriber. It is understood that such dynamic allocation provides more efficient use of 800 numbers than a scheme in which each user is assigned a separate 800 number which is fixed in time. In any event, the dialed 800 number serves as an access signal to the network assisted callback service. If a PIN is used, the network (e.g., via an AP) signals an information request to the calling party to enter the PIN.

In accordance with the present invention, the network callback service may include a range of features, and one or more of these features may be available to the subscriber depending on the subscriber's needs or desires. These user specific profiles may be stored by the network, and further, may be accessed and modified by the user. As a basic service, when the network assisted callback service is accessed by the subscriber via the 800 number from any telephone station, the network automatically connects the subscriber to the most recent calling party as determined by the information stored in the network for the subscriber based on the information stored in the network in step 225 (FIG. 2B). One way the network may effectuate this connection is by temporarily provisioning the 800 number with the number of the calling party. Such a translation is a standard function of the NCP unit in handling 800 numbers. Another way the network may make the connection is by making an outbound call to the calling party, and then merging the user's incoming call with the outbound call.

In a further embodiment of the present invention, in connection with the procedures described with reference to FIG. 2A and FIG. 2B, the network may store a full list of all calling parties. When the user accesses the network assisted callback service, the network announces the phone numbers and/or the names of the individuals who have called, and for each call asks if the user wishes to return the call, delete the call, or hold the call for future action. If the user chooses to return the call, the network dials the number and connects the user to this outgoing call. When this call ends, or when the user enters a DTMF code, the user returns to the main menu, and can continue returning phone calls in this manner. This embodiment highlights an attendant advantage provided by the present invention, whereby a user may return many phone calls by placing one outgoing 800 call.

Although the above description provides many specificities, these enabling details should not be construed as limiting the scope of the invention, and it will be readily understood by those persons skilled in the art that the present invention is susceptible to many modifications, adaptations, and equivalent implementations without departing from this scope. For example, although the network assisted callback method was described hereinabove in connection with an interexchange network, it is understood by one skilled in the art that such a network assisted callback method may be implemented within a LEC network, or across international network boundaries. It is understood, however, that if a LEC offered such a service, then calls originating from, or directed to, locations not within the subscriber's LEC (e.g., original call to subscriber, subscriber call to access service, outbound call) would have to be routed appropriately through an interexchange network. These and other changes can be made without departing from the spirit and the scope of the invention and without diminishing its attendant advantages. It is therefore intended that the present invention is not limited to the disclosed embodiments but should be defined in accordance with the claims which follow.

We claim:

1. A network-assisted callback method providing for automatic callback of a call placed to a called station associated with a called party from a calling party who designates a phone number associated with establishing a direct connection to said called station, said method comprising the steps, executed by the network, of:
    directly routing said call to said called station in a single routing process in response to the calling party placing the call by designating the phone number associated with establishing a direct connection to said called station;
    storing at the network information associated with said calling party and terminating said call, in the event that said routing step results in a predetermined condition indicating a failed connection;
    receiving an accessing signal from said called party, said accessing signal exclusive of a phone number of said calling party and initiated by said called party at any one of a plurality of locations;
    providing to said called party, by operation of the network in response to said accessing signal, a connection to said calling party based on the stored information for said calling party.

2. The method according to claim 1, further comprising, after said step of receiving a call, the step of determining whether said called party is a subscriber to said network assisted callback.

3. The method according to claim 1, wherein said storing step comprises the steps of prompting said calling party, receiving an information signal from said calling party in response to said prompting, and storing said information associated with said information signal.

4. The method according to claim 3, wherein said prompting includes requesting a voice message.

5. The method according to claim 3, wherein said prompting includes requesting confirmation of an automatic number identification signal.

6. The method according to claim 3, wherein said prompting includes requesting entry of a phone number using multiple frequency signals.

7. The method according to claim 1, wherein said accessing signal includes a toll-free number.

8. The method according to claim 1, wherein said information includes automatic number identification for said calling party.

9. The method according to claim 1, further comprising the step of transmitting a signal to a personal calling number, wherein said personal calling number is associated with a device for receiving said signal.

10. The method according to claim 1, wherein said connection is provided using revertive calling techniques.

11. A network-assisted callback method providing for automatic callback of a call placed to a called station associated with a called party from a calling party at a calling station, said calling party designating a phone number associated with establishing a direct connection to said called station, said method comprising the steps, executed by the network, of:
    routing said call in a single routing process for establishing a direct connection between said calling station and said called station;
    storing at the network information associated with said calling party and terminating said call;
    receiving at the network an accessing signal from said called party, said accessing signal exclusive of a phone number of said calling party and initiated by said called party at any one of a plurality of locations having access to the network;
    providing to said called party, by operation of the network in response to said accessing signal, a connection to said calling party based on the stored information stored with said calling party.

12. The method according to claim 11, further comprising, after said storing step, the step of transmitting a signal to said called party, said signal indicating that said call was received.

13. The method according to claim 12, wherein said signal is a paging signal.

14. The method according to claim 12, wherein said signal includes a number for providing said accessing signal.

15. The method according to claim 14, wherein said number is a toll free number.

16. A network-assisted callback method, for returning a call to a calling party from a called party, comprising the steps, executed by the network, of:
    identifying, according to a predetermined condition, a telephone call directly routed in a single routing process to a called station and not received by said called party, wherein said telephone call is initiated by said calling party by designating a phone number associated with establishing a direct connection to a called station that is associated with said called party;
    acquiring at the network information associated with said telephone call initiated from said calling telephone;

storing said information at the network; and initiating a call, by operation of the network in response to a predetermined access signal received at the network from said called party, to said calling party according to said information, wherein said access signal is exclusive of a phone number of said calling party and is initiated by said called party at any one of a plurality of locations having access to the network.

17. A network-assisted callback system providing for automatic callback of a call placed to a called station associated with a called party from a calling party who designates a phone number associated with establishing a direct connection to said called station, said system comprising:

means for directly routing said call to said called station in a single routing process in response to the calling party placing the call by designating the phone number associated with establishing a direct connection to said called station;

means for storing at the network information associated with said calling party and terminating said call in the event that said routing step results in a predetermined condition indicating a failed connection;

means for receiving at the network an accessing signal from said called party, said accessing signal exclusive of a phone number of said calling party and initiated by said called party at any one of a plurality of locations having access to the network;

means for providing to said called party, by operation of the network in response to said accessing signal, a connection to said calling party based on the stored information for said calling party.

* * * * *